(12) United States Patent
Hashimoto

(10) Patent No.: US 11,091,056 B2
(45) Date of Patent: Aug. 17, 2021

(54) CONTROL DEVICE, PROGRAM AND CONTROL METHOD

(71) Applicant: HAPSMobile Inc., Tokyo (JP)

(72) Inventor: Naoyoshi Hashimoto, Kanagawa (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/106,217

(22) Filed: Nov. 30, 2020

(65) Prior Publication Data

US 2021/0078439 A1 Mar. 18, 2021

Related U.S. Application Data

(63) Continuation of application No. PCT/JP2019/029104, filed on Jul. 24, 2019.

(30) Foreign Application Priority Data

Aug. 16, 2018 (JP) .............................. JP2018-153037

(51) Int. Cl.
*B60L 58/12* (2019.01)
*B60L 50/60* (2019.01)
(Continued)

(52) U.S. Cl.
CPC .............. *B60L 58/12* (2019.02); *B60L 8/003* (2013.01); *B60L 50/60* (2019.02); *B64D 27/24* (2013.01);
(Continued)

(58) Field of Classification Search
CPC .. B64D 27/24; B64D 2211/00; G08G 5/0026; B64C 39/024; B60L 58/12; B60L 8/003; B60L 50/60; B60L 2200/10
See application file for complete search history.

(56) References Cited

U.S. PATENT DOCUMENTS 5,123,112 A * 6/1992 Choate .................. H04B 7/185
370/329
5,810,284 A * 9/1998 Hibbs .................... B64D 27/24
244/13

(Continued)

FOREIGN PATENT DOCUMENTS

JP 2002211496 A 7/2002
JP 2011019039 A 1/2011
(Continued)

OTHER PUBLICATIONS

Office Action issued for counterpart Japanese Application No. 2018-153037, issued by the Japanese Patent Office dated Mar. 10, 2020 (drafted on Mar. 4, 2020).

(Continued)

*Primary Examiner* — Tyler J Lee

(57) ABSTRACT

Provided is a control device for controlling a flight vehicle including a battery; and an antenna for forming a communication area on the ground to provide wireless communication service for a user terminal in the communication area by using electric power of the battery. The control device comprises a control unit for performing control so as to reduce the number of cells included in the communication area when a predetermined condition is satisfied while the flight vehicle forms the communication area including a plurality of cells to provide wireless communication service for the user terminal.

20 Claims, 9 Drawing Sheets

(51) Int. Cl.
*B60L 8/00* (2006.01)
*B64D 27/24* (2006.01)
*G08G 5/02* (2006.01)
*B64C 39/02* (2006.01)
*G08G 5/00* (2006.01)

(52) U.S. Cl.
CPC ........ *G08G 5/0026* (2013.01); *B60L 2200/10* (2013.01); *B64C 39/024* (2013.01); *B64D 2211/00* (2013.01)

(56) References Cited

U.S. PATENT DOCUMENTS

| | | | | |
|---|---|---|---|---|
| 6,018,659 | A * | 1/2000 | Ayyagari | H04B 7/18504 342/450 |
| 6,061,562 | A * | 5/2000 | Martin | H01Q 3/242 455/431 |
| 6,233,456 | B1 * | 5/2001 | Schiff | H04B 7/18541 455/439 |
| 6,944,450 | B2 | 9/2005 | Cox | H04B 7/18504 342/355 |
| 8,135,338 | B1 * | 3/2012 | Gelon | H04B 7/18582 455/13.1 |
| 8,781,727 | B1 * | 7/2014 | Bonawitz | G05D 1/104 701/422 |
| 9,302,782 | B2 * | 4/2016 | Frolov | H04B 7/18506 |
| 9,798,329 | B2 * | 10/2017 | Shattil | H04W 24/02 |
| 2001/0039189 | A1 | 11/2001 | Cox | |
| 2002/0132579 | A1 * | 9/2002 | Hart | H04B 7/1855 455/12.1 |
| 2004/0102191 | A1 * | 5/2004 | Pewitt | H04B 7/18504 455/431 |
| 2004/0253949 | A1 * | 12/2004 | Swensen | H04W 84/02 455/422.1 |
| 2005/0260948 | A1 * | 11/2005 | Regulinski | H04B 7/18513 455/12.1 |
| 2006/0040660 | A1 * | 2/2006 | Cruz | H04B 7/18506 455/431 |
| 2006/0281476 | A1 * | 12/2006 | Lane | H04B 7/185 455/502 |
| 2006/0292990 | A1 * | 12/2006 | Karabinis | H04B 7/18513 455/63.4 |
| 2007/0135051 | A1 * | 6/2007 | Zheng | H04B 7/18563 455/63.1 |
| 2010/0269143 | A1 * | 10/2010 | Rabowsky | H04N 7/20 725/63 |
| 2013/0044677 | A1 * | 2/2013 | Lucidarme | H04B 7/18504 370/316 |
| 2013/0070677 | A1 * | 3/2013 | Chang | H04B 7/18517 370/328 |
| 2014/0105054 | A1 * | 4/2014 | Saegrov et al. | H01Q 3/267 370/252 |
| 2014/0241239 | A1 * | 8/2014 | Chang | H04B 7/18504 370/316 |
| 2015/0236778 | A1 * | 8/2015 | Jalali | H04B 7/18504 370/316 |
| 2015/0358833 | A1 | 12/2015 | Konishi | |
| 2016/0219454 | A1 | 7/2016 | Sawai | |
| 2016/0337990 | A1 | 11/2016 | Mitsui | |
| 2017/0086113 | A1 | 3/2017 | Kabashima | |
| 2017/0202025 | A1 * | 7/2017 | Ouchi | H04W 52/346 |
| 2018/0166779 | A1 | 6/2018 | Feria | |
| 2018/0352443 | A1 * | 12/2018 | Hwang | H04W 16/26 |
| 2019/0058522 | A1 * | 2/2019 | Haley | G06F 16/23 |
| 2019/0316910 | A1 * | 10/2019 | Floury | H04B 7/18504 |

FOREIGN PATENT DOCUMENTS

| | | |
|---|---|---|
| JP | 2014138338 A | 7/2014 |
| JP | 2017060024 A | 3/2017 |
| JP | 2017163439 A | 9/2017 |
| WO | 2015052973 A1 | 4/2015 |
| WO | 2015115356 A1 | 8/2015 |
| WO | 2017091011 A1 | 6/2017 |

OTHER PUBLICATIONS (ISA/237) Written Opinion of the International Search Authority for International Patent Application No. PCT/JP2019/029104, mailed by the Japan Patent Office dated Oct. 21, 2019.

Decision to Grant a Patent issued for counterpart Japanese Application No. 2018-153037, issued by the Japanese Patent Office dated Jul. 14, 2020 (drafted on Jul. 6, 2020).

Extended European Search Report for European Patent Application No. 19850390.6, issued by the European Patent Office dated Jul. 2, 2021.

* cited by examiner

CONTROL DEVICE, PROGRAM AND CONTROL METHOD

The contents of the following Japanese and PCT applications are incorporated herein by reference:
NO. 2018-153037 filed in JP on Aug. 16, 2018, and
NO. PCT/JP2019/029104 filed in WO on Jul. 24, 2019.

BACKGROUND

1. Technical Field

The present invention relates to a control device, a program and a control method.

2. Related Art

Known is a flight vehicle that includes an antenna and flies in the stratosphere, so as to provide a stratosphere platform (for example, refer to Patent Document 1).

CITATION LIST

Patent Document

Patent Document 1: Japanese Patent Application Publication No. 2002-211496

Technical Problem

It is preferably to provide technology that can contribute to solving electric power shortage of a flight vehicle.

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
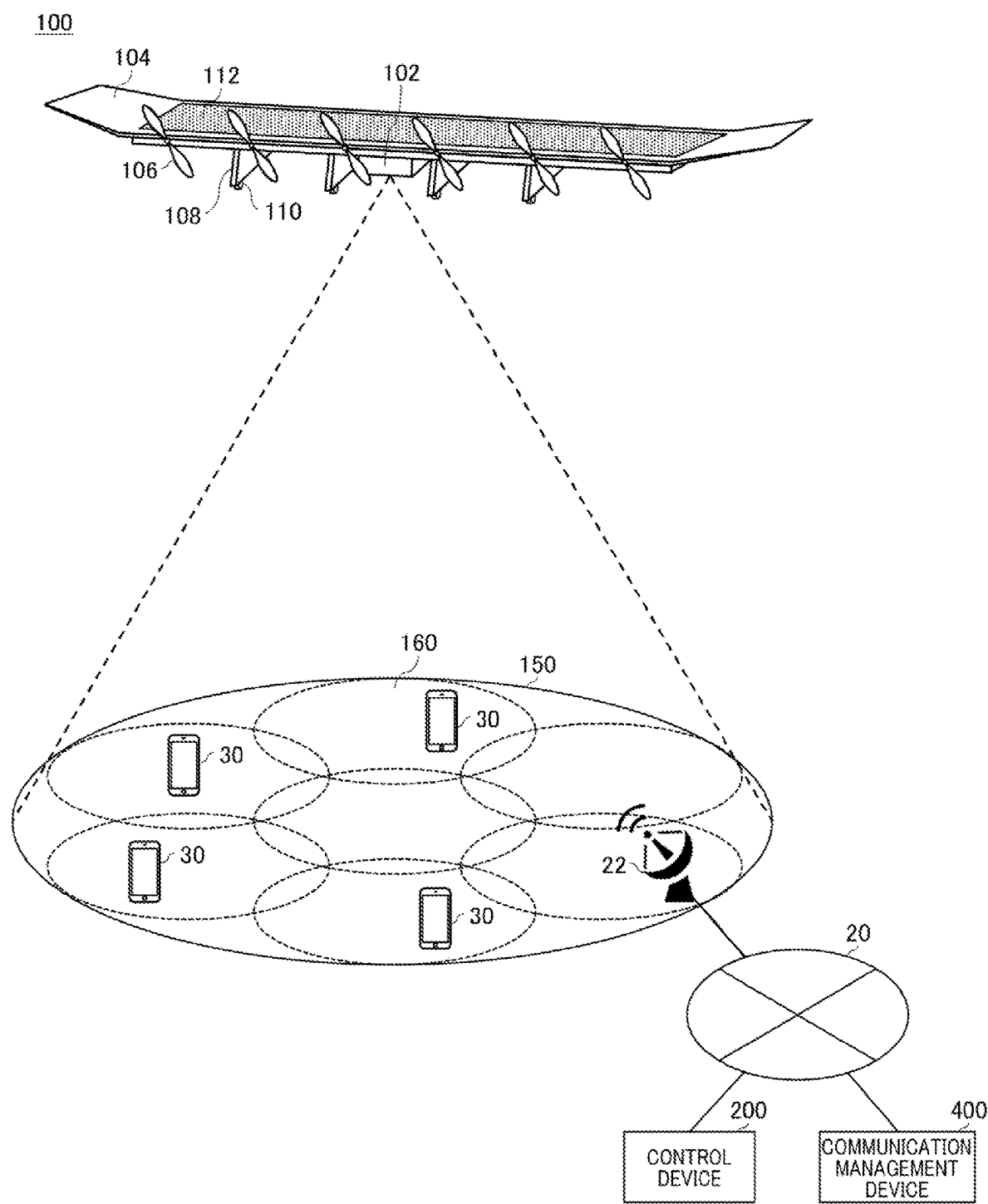
FIG. 1 shows schematically an example of a flight vehicle 100.

FIG. 1 shows schematically an example of a flight vehicle 100. The flight vehicle 100 includes a main body 102 and a main wing 104. The main body 102 includes propellers 106, skids 108, and wheels 110. The main wing 104 includes a solar cell panel 112.

The main body 102 includes a battery and an antenna, which are not shown. Electric power generated by the solar cell panel 112 is stored in the battery. The flight vehicle 100 can fly by rotating the propellers 106 by using the electric power stored in the battery. The flight vehicle 100 also forms a communication area 150 on the ground to provide wireless communication service for user terminals 30 in the communication area 150 by the antenna by using the electric power stored in the battery. The antenna may be a multi-beam antenna, for example, and the communication area 150 may be formed by one or more cells 160. The flight vehicle 100 flies in the stratosphere to provide wireless communication service for the user terminals 30 on the ground, for example. The flight vehicle 100 may function as a stratosphere platform.

The user terminal 30 may be any communication terminal as long as it can communicate with the flight vehicle 100. For example, the user terminal 30 is a mobile phone such as a smartphone. The user terminal 30 may also be a tablet terminal, a PC (Personal Computer) and the like. An access point such as wireless LAN, an IoT (Internet of Things) device and a data communication module are also possible.

The flight vehicle 100 provides wireless communication service for the user terminal 30 by relaying communication between the user terminal 30 and a network 20 on the ground, for example. The network 20 may include a core network that is provided by a telecommunication carrier. The network 20 may also include the Internet.

The flight vehicle 100 may communicate with the network 20 via a gateway 22 in the communication area 150, of gateways 22 arranged in each region on the ground. For example, the flight vehicle 100 may also communicate with the network 20 via a communication satellite (not shown).

The flight vehicle 100 transmits data received from the user terminal 30 in the communication area 150 to the network 20, for example. When the flight vehicle 100 receives data addressed to the user terminal 30 in the communication area 150 via the network 20, for example, the flight vehicle 100 also transmits the data to the user terminal 30.

The flight vehicle 100 may be controlled by a control device 200. The flight vehicle 100 flies according to an instruction transmitted by the control device 200 via the network 20 and the gateway 22, for example.

The control device 200 controls the flight vehicle 100 by transmitting an instruction. The control device 200 controls the flight vehicle 100 by instructing the flight vehicle 100 on a flying pattern, a flying speed, a size of the communication area 150, a shape of the communication area 150 and the number of the cells 160 included in the communication area 150.

The flight vehicle 100 of the present embodiment covers electric power for flight and electric power for formation of the communication area 150 mainly by electric power generation by the solar cell panel 112. The solar cell panel 112 can generate electric power during a period for which sunlight can be received but cannot generate electric power during a period such as night-time for which sunlight cannot be received. Therefore, it is important to manage the electric power stored in the battery.

The control device 200 of the present embodiment performs control so as to reduce the number of cells 160 included in the communication area 150 when a predetermined condition is satisfied while the flight vehicle 100 forms the communication area 150 including a plurality of cells 160 to provide wireless communication service for the user terminals 30. When a remaining battery level of the battery of the flight vehicle 100 is smaller than a predetermined threshold value, for example, the control device 200 reduces the number of the cells 160 included in the communication area 150. Thereby, although the number of the user terminals 30 for which wireless communication service can be provided is reduced, it is possible to reduce electric power consumption of the battery. As a result, it is possible to reduce a possibility that the electric power of the battery will be exhausted until the battery can be next charged by the solar cell panel 112.

When an electric power generation amount generated by the solar cell panel 112 is smaller than a predetermined threshold value, for example, the control device 200 also reduces the number of the cells 160 included in the communication area 150. When a light-receiving amount received by the solar cell panel 112 is smaller than a predetermined threshold value, for example, the control device 200 also reduces the number of the cells 160 included in the communication area 150. Thereby, when the electric power generation by the solar cell panel 112 cannot be performed during the night-time, for example, it is possible to reduce electric power consumption of the battery, so that it is possible to reduce a possibility that the remaining battery level will be exhausted until the electric power generation by the solar cell panel 112 can be performed during the day-time.

The control device 200 also refers to variation in communication traffic for each date and time in the wireless communication service that is provided for the plurality of user terminals 30 by the flight vehicle 100, specifies a time period during which the communication traffic is smaller than a predetermined threshold value, and reduces the number of cells 160 included in the communication area 150 during the specified time period, for example. The control device 200 also refers to the communication traffic in the wireless communication service that is provided for the plurality of user terminals 30 by the flight vehicle 100, for example, and reduces the number of cells 160 included in the communication area 150 when a duration time in a state where the communication traffic is smaller than a predetermined threshold value is longer than a predetermined threshold value, for example. Thereby, it is possible to appropriately reduce electric power consumption of the battery during a time period for which there are few problems even though the number of the user terminals 30 for which wireless communication service can be provided is reduced.

The control device 200 may receive variation information indicative of variation in communication traffic for each date and time in the wireless communication service that is provided for the plurality of user terminals 30 by the flight vehicle 100, from a communication management device 400 for managing communication of the plurality of user terminals 30, via the network 20. The control device 200 may also receive, from the flight vehicle 100, the communication traffic in the wireless communication service that is provided for the plurality of user terminals 30 by the flight vehicle 100.

When the number of ground wireless base stations equipped in a target area on the ground that is covered by the communication area 150 is large, for example, the control device 200 also reduces the number of the cells 160 included in the communication area 150. For example, the control device 200 reduces the number of the cells 160 included in the communication area 150 to a number corresponding to the number of the ground wireless base stations in the target area. Thereby, it is possible to appropriately reduce electric power consumption of the battery in a situation where the number of the ground wireless base stations in the target area is large and the user terminals 30 in the target area can receive wireless communication service even though the wireless communication service is not provided by the flight vehicle 100.

Figure 2:
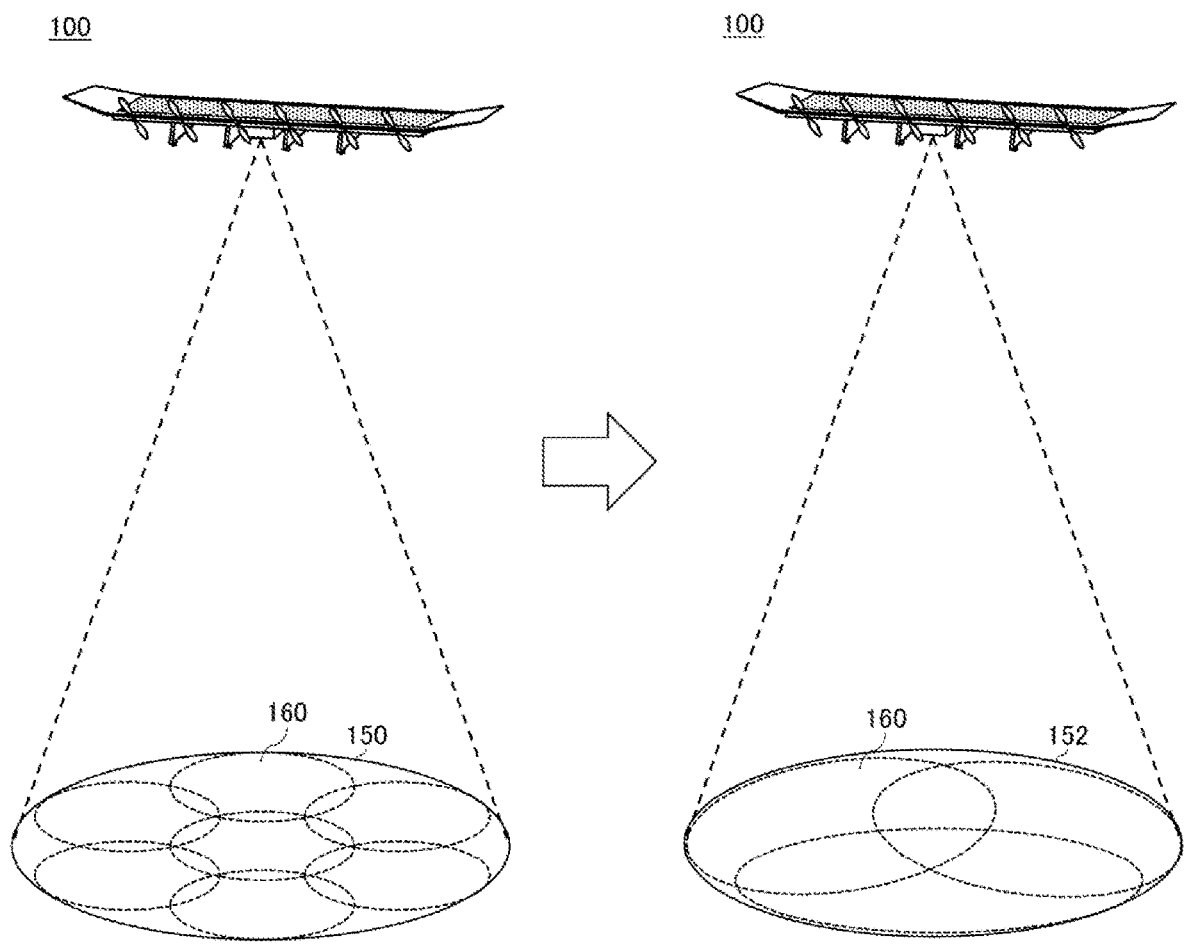
FIG. 2 shows schematically an example of a communication area 150 before reducing the number of cells and a communication area 152 after reducing the number of cells.

FIG. 2 shows schematically an example of the communication area 150 before reducing the number of cells and a communication area 152 after reducing the number of cells. FIG. 2 exemplifies a case where the communication area 150 before reducing the number of cells includes seven cells 160, and the communication area 152 after reducing the number of cells includes three cells 160.

The flight vehicle 100 may form the communication area 150 including any number of the cells 160, and the number of the cells 160 included in the communication area 150 before reducing the number of cells is not limited to seven and may also be any number. The control device 200 may reduce any number of the cells 160 when reducing the number of the cells 160 included in the communication area 150. For example, in the case shown in FIG. 2, the control device 200 may reduce the number of the cells 160 in the communication area 150 including the seven cells 160 to any number ranging from 1 to 6.

When reducing the number of the cells 160 in the communication area 150, the control device 200 may change shapes of the cells 160 after reduction so that the communication area 150 is entirely covered by the cells 160 after reduction. FIG. 2 shows an example where the three cells 160 are changed so as to cover the entire communication area 150 by the three cells 160.

When reducing the number of the cells 160 in the communication area 150, the control device 200 may determine a cell to be continued and a cell to be stopped from the plurality of cells 160 included in the communication area 150, and stop the cell to be stopped, thereby reducing the number of the cells 160 in the communication area 150. Note that, when reducing the number of the cells 160 in the communication area 150, the control device 200 may stop once all of the plurality of cells 160 included in the communication area 150 and cause the flight vehicle 100 to newly form a plurality of cells 160 smaller than the original number.

Figure 3:
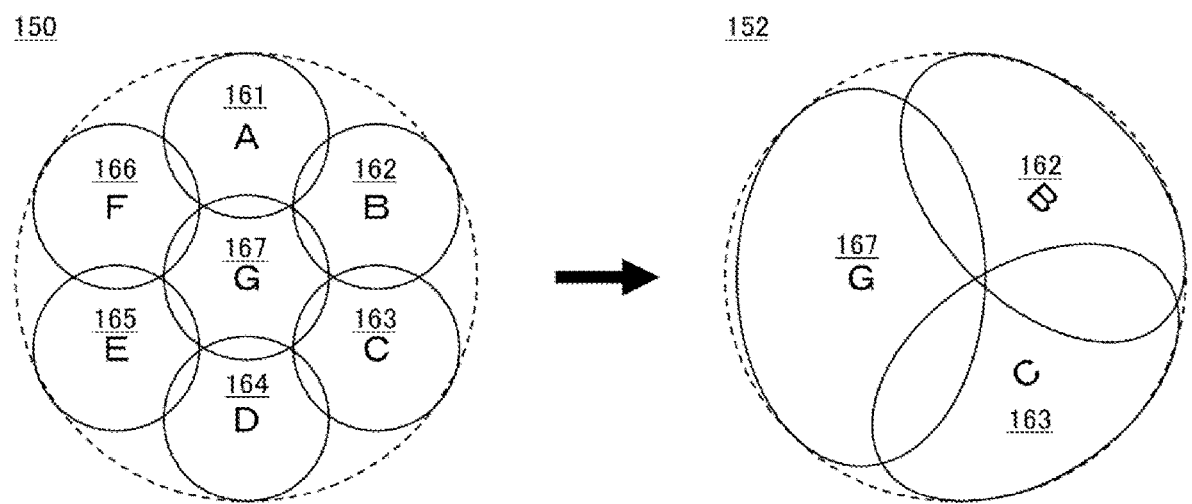
FIG. 3 shows schematically an example of the communication area 150 before reducing the number of cells and the communication area 152 after reducing the number of cells.

FIG. 3 shows schematically an example of the communication area 150 before reducing the number of cells and the communication area 152 after reducing the number of cells. Herein, a case is exemplified in which the communication area 150 before reducing the number of cells includes a cell A161, a cell B162, a cell C163, a cell D164, a cell E165, a cell F166, and a cell G167 and the communication area 152 after reducing the number of cells includes the cell B162, the cell D164, and the cell G167, which are changed.

As described above, when reducing the number of the cells included in the communication area 150, the control device 200 may determine a cell to be continued and a cell to be stopped from the plurality of cells included in the communication area 150. A method of determining a cell to be continued and a cell to be stopped from the plurality of cells included in the communication area 150 may be any method. For example, when forming a plurality of cells, an order of stopping the plurality of cells may be preset. As a specific example, in a case where an order of the cell A161, the cell B162, the cell C163, the cell D164, the cell E165, the cell F166, and the cell G167 is preset, the control device 200 determines the cell to be stopped according to the order. In this example, when reducing the cells by one, the control device 200 determines the cell A161, as the cell to be stopped. When reducing the cells by two, the control device 200 determines the cell A161 and the cell B162, as the cell to be stopped. When reducing the cells by three, the control device 200 determines the cell A161, the cell B162, and the cell C163, as the cell to be stopped.

The control device 200 may also determine a cell having a higher communication traffic, as the cell to be continued. For example, in the case shown in FIG. 3, when the communication traffic is higher in order of the cell B162, the cell C163, the cell G167, the cell A161, the cell D164, the cell E165 and the cell F166, the control device 200 determines the cell to be continued according to the order. For example, when reducing the number of the cells by four, the control device 200 determines the cell B162, the cell C163, and the cell G167, as the cell to be continued, and determines the cell A161, the cell D164, the cell E165, and the cell F166, as the cell to be stopped.

For example, if the cell B162 having the highest communication traffic is determined as the cell to be stopped, the cell B162 is stopped, so that communication disconnection or handover occurs in many user terminals 30. In contrast, when a cell having higher communication traffic is determined as the cell to be continued, it is possible to reduce the number of the user terminals 30 in which communication disconnection or handover occurs.

Figure 4:
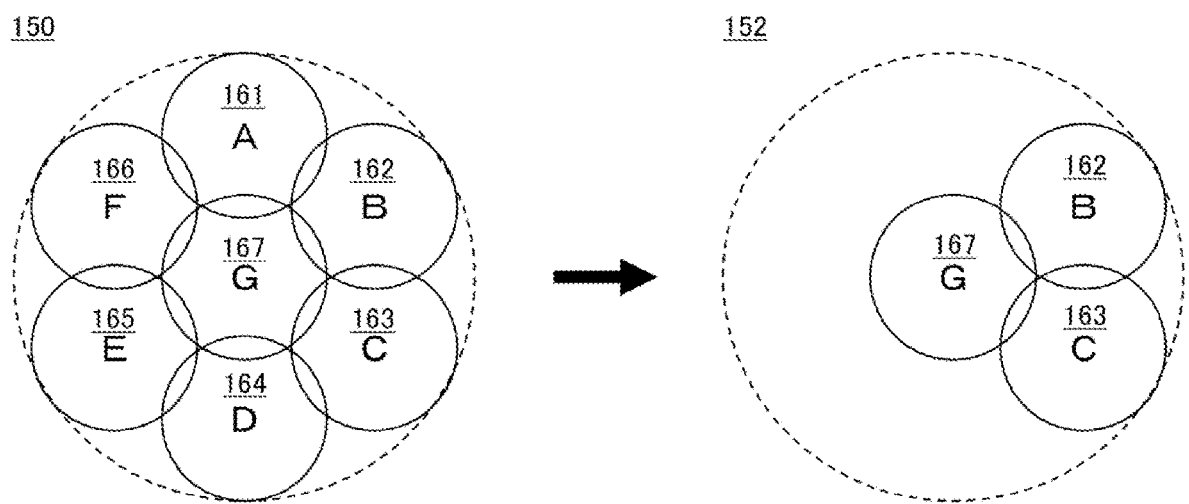
FIG. 4 shows schematically an example of the communication area 150 before reducing the number of cells and the communication area 152 after reducing the number of cells.

FIG. 4 shows schematically an example of the communication area 150 before reducing the number of cells and the communication area 152 after reducing the number of cells. Herein, differences from FIG. 3 are mainly described. In the example shown in FIG. 4, the cell B162, the cell C163, and the cell G167 included in the communication area 152 are not changed. In this way, the control device 200 may not change the shape of the cell to be continued.

Thereby, although the target area that can be covered by the flight vehicle 100 becomes smaller, it is possible reduce electric power consumption of the flight vehicle 100 without affecting the user terminals 30 existing in the cell B162, the cell C163, and the cell G167, which are the cells to be continued.

Figure 5:
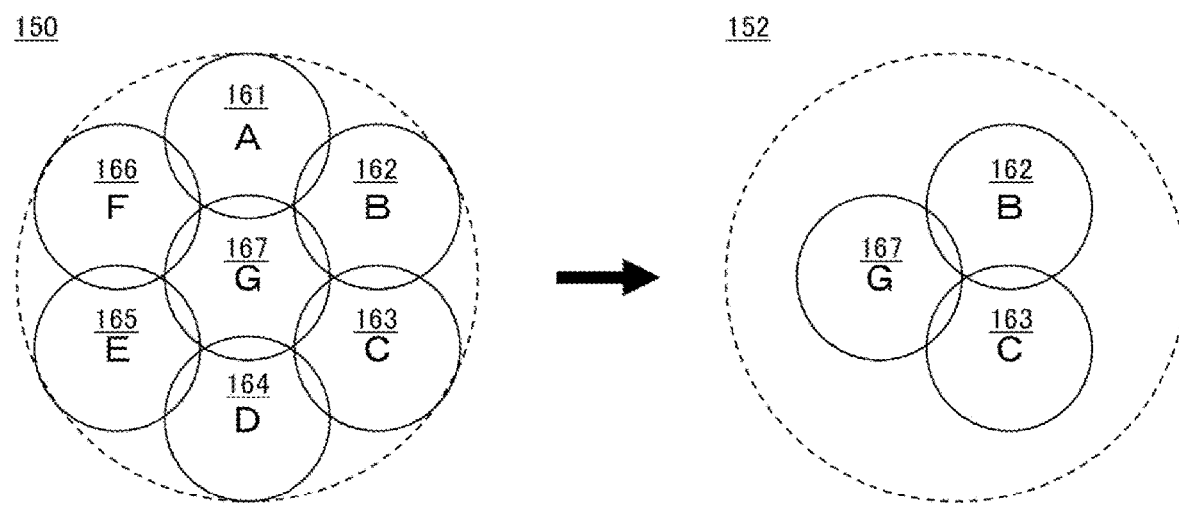
FIG. 5 shows schematically an example of the communication area 150 before reducing the number of cells and the communication area 152 after reducing the number of cells.

FIG. 5 shows schematically an example of the communication area 150 before reducing the number of cells and the communication area 152 after reducing the number of cells. Herein, differences from FIG. 4 are mainly described. In the example shown in FIG. 5, the cell B162, the cell C163, and the cell G167 included in the communication area 152 are not changed in terms of shapes but are changed in terms of positions. In this way, the control device 200 may changes the positions of the cells to be continued. For example, as exemplified in FIG. 5, the control device 200 moves the cell B162, cell C163 and cell G167 to be continued so that a central part of the target area is covered by the cells. The control device 200 may move the cells by transmitting an instruction to change an azimuth of the antenna to the flight vehicle 100. Thereby, for example, it is possible to cover a highly important area of the target area by the cells after reduction.

Figure 6:
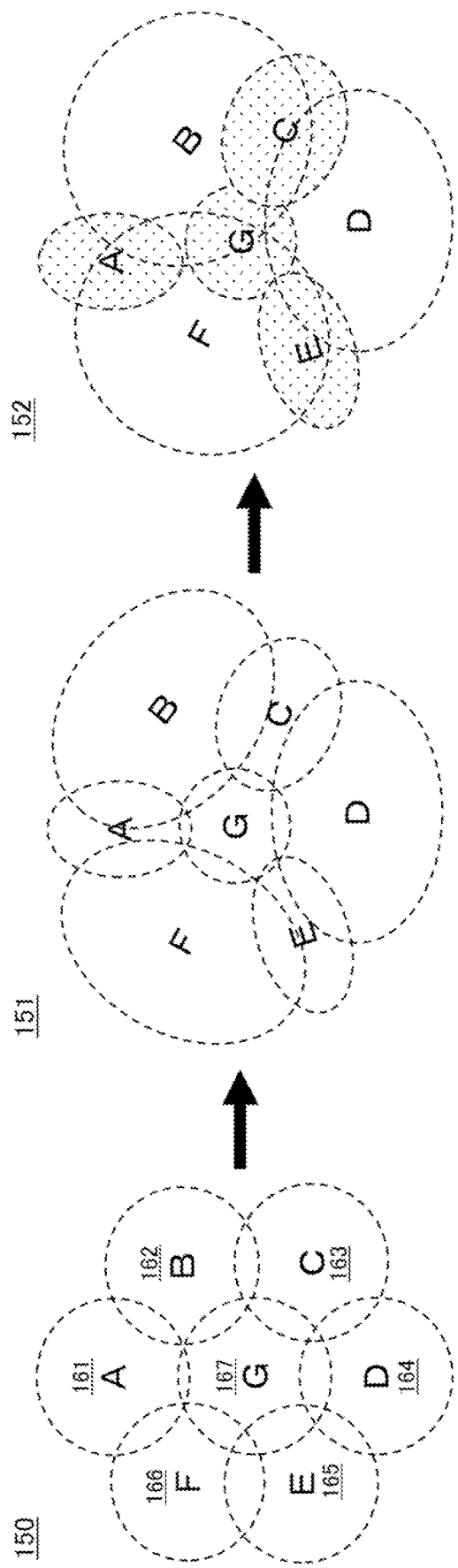
FIG. 6 shows schematically an example of the communication area 150 before reducing the number of cells, a communication area 151 while reducing the number of cells, and the communication area 152 after reducing the number of cells.

FIG. 6 shows schematically an example of the communication area 150 before reducing the number of cells, a communication area 151 while reducing the number of cells, and the communication area 152 after reducing the number of cells. Herein, a flow of cell-number reducing processing is schematically shown when the cell B162, the cell D164 and the cell F166 of the plurality of cells included in the communication area 150 are determined as the cells to be continued and the cell A161, the cell C163, the cell E165 and the cell G167 are determined as the cells to be stopped.

The control device 200 may perform control so as to reduce the number of cells included in the communication area 150 by continuously increasing a size of the cell to be continued, continuously decreasing a size of the cell to be stopped and then stopping formation of the cell to be stopped.

In the example shown in FIG. 6, sizes of the cell B162, the cell D164 and the cell F166 in the communication area 151 are greater than sizes of the cell B162, the cell D164 and the cell F166 in the communication area 150. Also, sizes of the cell A161, the cell C163, the cell E165 and the cell G167 in the communication area 151 are smaller than sizes of the cell A161, the cell C163, the cell E165 and the cell G167 in the communication area 150.

The control device 200 may stop formation of the cell to be stopped, after it is possible to cover the entire target area by increasing the cell to be continued. In the example shown in FIG. 6, since it is possible to cover the entire target area by the cell B162, the cell D164 and the cell F166 in the communication area 152, the cell A161, the cell C163, the cell E165 and the cell G167 are stopped.

When stopping the cell A161, the cell C163, the cell E165 and the cell G167 of the cell A161, the cell B162, the cell C163, the cell D164, the cell E165, the cell F166 and the cell G167, if the sizes of the cell B162, the cell D164 and the cell F166 are increased after stopping the cell A161, the cell C163, the cell E165 and the cell G167, for example, communication of the user terminals 30 existing in the cell A161, the cell C163, the cell E165 and the cell G167 is temporarily disconnected. In contrast, when control is performed by the flow as shown in FIG. 6, the cell A161, the cell C163, the cell E165, and the cell G167 can be stopped after the user terminals 30 existing in the cell A161, the cell C163, the cell E165 and the cell G167 are handed over to any one of the cell B162, the cell D164 and the cell F166, so that it is possible to reduce the number of the user terminals 30 in which communication is temporarily disconnected.

Note that, the control device 200 may perform control for easily handing over the user terminal 30 existing in the cell to be stopped to the cell to be continued. Herein, control for easily handing over the user terminal 30 existing in the cell C163 to the cell B162 is described as an example.

For example, the control device 200 adjusts a handover threshold value corresponding to the user terminal 30 existing in the cell C163, so as to easily hand over the user terminal to the cell B162. As a specific example, in a case where a handover threshold value is set so as to perform handover when a state where electric power received from the cell B162 is equal to or higher than X dB continues for Y seconds or longer, the control device 200 reduces the values of X and Y. The control device 200 may also reduce an output corresponding to the cell C163 for easy handover from the cell C163 to the cell B162.

Figure 7:
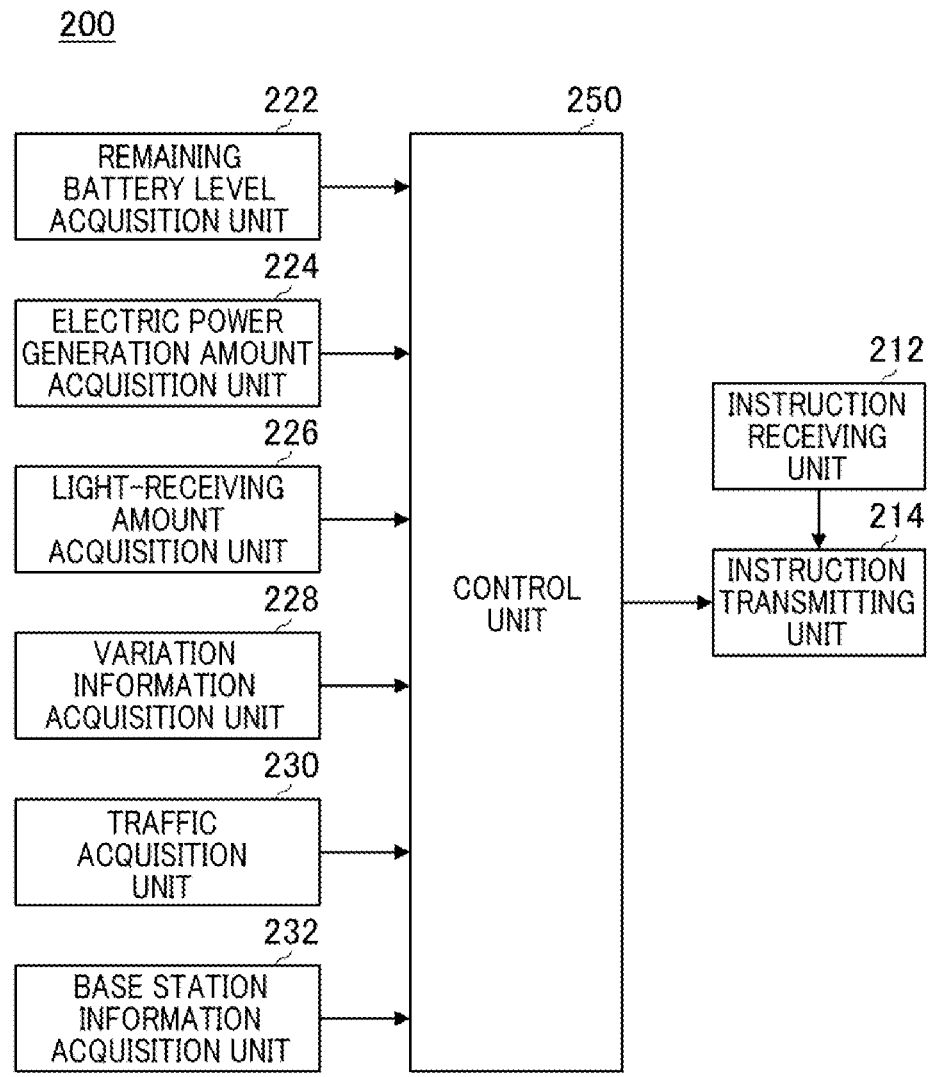
FIG. 7 shows schematically an example of a functional configuration of a control device 200.

FIG. 7 shows schematically an example of a functional configuration of the control device 200. The control device 200 comprises an instruction receiving unit 212, an instruction transmitting unit 214, a remaining battery level acquisition unit 222, an electric power generation amount acquisition unit 224, a light-receiving amount acquisition unit 226, a variation information acquisition unit 228, a traffic acquisition unit 230, a base station information acquisition unit 232, and a control unit 250. Note that, it is not necessarily required that the control device 200 should have all the configurations.

The instruction receiving unit 212 receives a variety of instructions. The instruction receiving unit 212 receives an instruction to designate the target area, for example. The instruction receiving unit 212 also receives an instruction on a flying pattern of a plurality of flight vehicles 100, for example. The instruction receiving unit 212 also receives instructions on positions, speeds and the like of the plurality of flight vehicles 100. The instruction receiving unit 212 also receives instructions on positions, sizes, frequency bands and the like of the communication areas 150 that are formed by the plurality of flight vehicles 100. The instruction receiving unit 212 may also receive an instruction that is input via an operation unit provided for the control device 200. The instruction receiving unit 212 may also receive an instruction received via the network 20, via a communication unit provided for the control device 200.

The instruction transmitting unit 214 transmits the instruction received by the instruction receiving unit 212 to the flight vehicle 100. The instruction transmitting unit 214 may also transmit the instruction to the plurality of flight vehicles 100. The instruction transmitting unit 214 may also transmit the instruction to one flight vehicle 100 of the plurality of flight vehicles 100, and the one flight vehicle 100 may transmit the instruction to the other flight vehicles 100.

The remaining battery level acquisition unit 222 acquires a remaining battery level of the flight vehicle 100. The remaining battery level acquisition unit 222 may also receive remaining battery level information indicative of the remaining battery level of the battery of the flight vehicle 100 from the flight vehicle 100.

The electric power generation amount acquisition unit 224 acquires an electric power generation amount of the flight vehicle 100. The electric power generation amount acquisition unit 224 may also acquire an electric power generation amount generated by the solar cell panel 112. The electric power generation amount acquisition unit 224 may also receive electric power generation amount information indicative of the electric power generation amount of the flight vehicle 100 from the flight vehicle 100.

The light-receiving amount acquisition unit 226 acquires a light-receiving amount that is received by the solar cell panel 112 of the flight vehicle 100. The light-receiving amount acquisition unit 226 may also receive light-receiving amount information indicative of the light-receiving amount that is received by the solar cell panel 112, from the flight vehicle 100. When the solar cell panel 112 has a light-receiving amount sensor, for example, the flight vehicle 100 transmits light-receiving amount information, which indicates a light-receiving amount detected by the light-receiving amount sensor, to the control device 200. The flight vehicle 100 may also include a light-receiving amount sensor equipped in the vicinity of the solar cell panel 112, and transmit light-receiving amount information, which indicates a light-receiving amount detected by the light-receiving amount sensor, to the control device 200.

The variation information acquisition unit 228 acquires variation information indicative of variation in communication traffic for each date and time in the wireless communication service that is provided for the plurality of user terminals 30 by the flight vehicle 100. The variation information acquisition unit 228 may also receive the variation information from the communication management apparatus 400. The communication management apparatus 400 may also be equipped in a core network or the like of a telecommunication carrier that provides wireless communication service for the user terminal 30, for example.

The traffic acquisition unit 230 acquires a communication traffic in the wireless communication service that is provided for the plurality of user terminals 30 by the flight vehicle 100. The traffic acquisition unit 230 may also receive traffic information, which indicates the communication traffic in the wireless communication service that is provided for the plurality of user terminals 30 by the flight vehicle 100, from the flight vehicle 100. The traffic acquisition unit 230 may also receive the traffic information, which indicates the communication traffic in the wireless communication service that is provided for the plurality of user terminals 30 by the flight vehicle 100, from the communication management apparatus 400.

The base station information acquisition unit 232 acquires base station information about a ground wireless base station equipped in a target area on the ground that is covered by the communication area 150 formed by the flight vehicle 100. The base station information may also include the number of ground wireless base stations equipped in the target area. The base station information acquisition unit 232 may also receive the base station information from the communication management apparatus 400.

The control unit 250 performs control so as to reduce the number of cells 160 included in the communication area 150 when a predetermined condition is satisfied while the flight vehicle 100 forms the communication area 150 including the plurality of cells 160 to provide wireless communication service for the user terminals 30.

The control unit 250 performs control so as to reduce the number of cells 160 included in the communication area 150 when the remaining battery level acquired by the remaining battery level acquisition unit 222 is smaller than a predetermined threshold value, for example. The threshold value may be arbitrarily set or may be changed. The control unit 250 may also set a different reduction number for each of a plurality of threshold values. For example, control may be performed so that when the remaining battery level becomes smaller than a first threshold value, the number of the cells 160 included in the communication area 150 is reduced by one, and when the remaining battery level becomes smaller than a second threshold value smaller than the first threshold value, the number of the cells 160 included in the communication area 150 is reduced by two.

The control unit 250 performs control so as to reduce the number of cells 160 included in the communication area 150 when the electric power generation amount acquired by the electric power generation amount acquisition unit 224 is smaller than a predetermined threshold value, for example. The threshold value may be arbitrarily set or may be changed. The control unit 250 may also set a different reduction number for each of a plurality of threshold values. For example, control may be performed so that when the electric power generation amount becomes smaller than a first threshold value, the number of the cells 160 included in the communication area 150 is reduced by one, and when the electric power generation amount becomes smaller than a second threshold value smaller than the first threshold value, the number of the cells 160 included in the communication area 150 is reduced by two.

The control unit 250 performs control so as to reduce the number of cells 160 included in the communication area 150 when the light-receiving amount acquired by the light-receiving amount acquisition unit 226 is smaller than a predetermined threshold value, for example. The threshold value may be arbitrarily set or may be changed. The control unit 250 may also set a different reduction number for each of a plurality of threshold values. For example, control may be performed so that when the light-receiving amount becomes smaller than a first threshold value, the number of the cells 160 included in the communication area 150 is reduced by one, and when the light-receiving amount becomes smaller than a second threshold value smaller than the first threshold value, the number of the cells 160 included in the communication area 150 is reduced by two.

The control unit 250 specifies a time period during which the communication traffic is smaller than the predetermined threshold value, based on the variation information acquired by the variation information acquisition unit 228, for example, and performs control so as to reduce the number of the cells 160 included in the communication area 150 for the specified time period. For example, when a time period from 1:00 to 5:00 is specified, the control unit 250 may perform control so as to reduce the number of the cells 160 included in the communication area 150 for the time period from 1:00 to 5:00. The control unit 250 may specify a time period during which there is no distinction between weekdays and holidays, a time period for each weekday, and a time period for each holiday, for example. The control unit 250 may also specify a time period in any unit such as a time period for each day and a time period for each season. The control unit 250 may also set a different reduction number for each time period. For example, control may be performed so that the number of the cells 160 included in the communication area 150 is reduced by two for a time period during which the communication traffic is smaller than a first threshold value and the number of the cells 160 included in the communication area 150 is reduced by one for a time period during which the communication traffic is smaller than a second threshold value greater than the first threshold value.

The control unit 250 performs control so as to reduce the number of the cells 160 included in the communication area 150 when the communication traffic acquired by the traffic acquisition unit 230 satisfies a predetermined condition, for example. The condition may be that a duration time in a state where the communication traffic is smaller than a predetermined threshold value is longer than a predetermined period, for example. The threshold value and the period may be arbitrarily set or may be changed. The control unit 250 may also set a different reduction number for each of a plurality of threshold values.

The control unit 250 performs control so as to reduce the number of cells 160 included in the communication area 150 when the base station information acquired by the base station information acquisition unit 232 satisfies a predetermined condition, for example. For example, the control unit 250 performs control so as to reduce the number of the cells 160 included in the communication area 150 to a number corresponding to the number of ground wireless base stations equipped in the target area.

The control unit 250 may determine, based on information about a target area on the ground that is covered by each of a plurality of cells included in the communication area 150, the cell to be continued and the cell to be stopped of the plurality of cells. For example, the control unit 250 determines a cell, in which a ratio of a city region of the covered target area is greater, of the plurality of cells, as the cell to be continued. Thereby, it is possible to preferentially continue the city region in which it is thought that the number of the user terminals 30 is larger than that in a rural region, so that it is possible to reduce the number of the user terminals 30 in which communication disconnection or handover occurs. The control unit 250 may also acquire the target area information on the ground, based on the base station information acquired by the base station information acquisition unit 232. The control unit 250 may also store in advance information about an area in each region.

Figure 8:
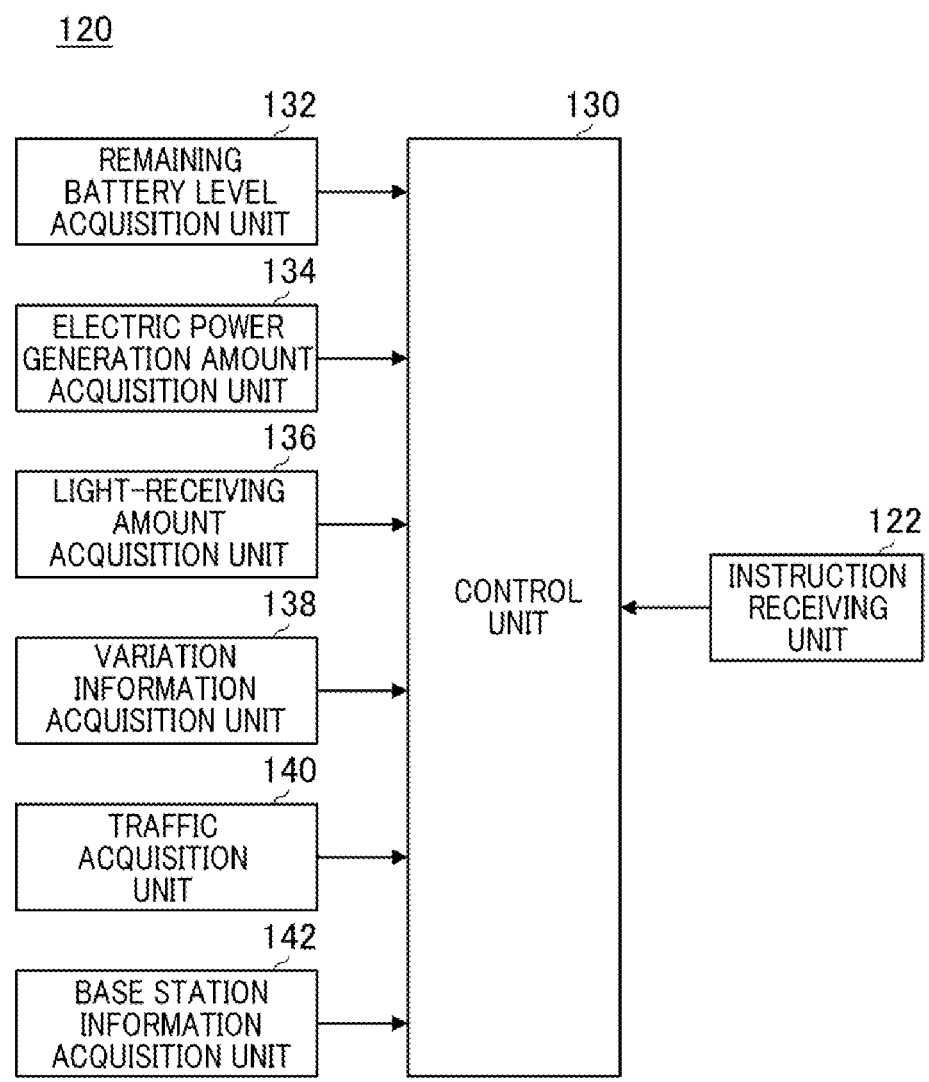
FIG. 8 shows schematically an example of a functional configuration of a control device 120 mounted on a flight vehicle 100.

FIG. 8 shows schematically an example of a functional configuration of a control device 120 mounted on the flight vehicle 100. The control device 120 comprises an instruction receiving unit 122, a control unit 130, a remaining battery level acquisition unit 132, an electric power generation amount acquisition unit 134, a light-receiving amount acquisition unit 136, a variation information acquisition unit 138, a traffic acquisition unit 140, and a base station information acquisition unit 142. Note that, it is not necessarily required that the control device 120 should have all the configurations. Herein, differences from the control device 200 described in FIG. 7 are mainly described.

The instruction receiving unit 122 receives an instruction from the control device 200. The instruction receiving unit 122 transmits the received instruction to the control unit 130. The control unit 130 may control the flight vehicle 100 according to the instruction received by the instruction receiving unit 122.

The remaining battery level acquisition unit 132 acquires a remaining battery level of the battery of the flight vehicle 100. The remaining battery level acquisition unit 222 may also acquire the remaining battery level from the battery.

The electric power generation amount acquisition unit 224 acquires an electric power generation amount of the flight vehicle 100. The electric power generation amount acquisition unit 224 may also acquire an electric power generation amount generated by the solar cell panel 112.

The light-receiving amount acquisition unit 226 acquires a light-receiving amount that is received by the solar cell panel 112 of the flight vehicle 100. In a case where the solar cell panel 112 has a light-receiving amount sensor, the light-receiving amount acquisition unit 226 may also acquire a light-receiving amount detected by the light-receiving amount sensor. In a case where the flight vehicle 100 has a light-receiving amount sensor equipped in the vicinity of the solar cell panel 112, the light-receiving amount acquisition unit 226 may also acquire a light-receiving amount detected by the light-receiving amount sensor.

The variation information acquisition unit 228 acquires variation information indicative of variation in communication traffic for each date and time in the wireless communication service that is provided for the plurality of user terminals 30 by the flight vehicle 100. The variation information acquisition unit 228 may also receive the variation information from the communication management apparatus 400.

The traffic acquisition unit 230 acquires a communication traffic in the wireless communication service that is provided for the plurality of user terminals 30 by the flight vehicle 100. The traffic acquisition unit 230 may also acquire the communication traffic by monitoring the communication traffic in the wireless communication service that is provided for the user terminals 30. The traffic acquisition unit 230 may also receive traffic information, which indicates the communication traffic in the wireless communication service that is provided for the plurality of user terminals 30 by the flight vehicle 100, from the communication management apparatus 400.

The base station information acquisition unit 232 acquires base station information about a ground wireless base station equipped in a target area on the ground that is covered by the communication area 150 formed by the flight vehicle 100. The base station information acquisition unit 232 may also receive the base station information from the communication management apparatus 400.

The control unit 250 performs control so as to reduce the number of cells 160 included in the communication area 150 when a predetermined condition is satisfied while the flight vehicle 100 forms the communication area 150 including the plurality of cells 160 to provide wireless communication service for the user terminals 30. The control unit 250 may also reduce the number of the cells 160 included in the communication area 150 by controlling the antenna, when the predetermined condition is satisfied.

Figure 9:
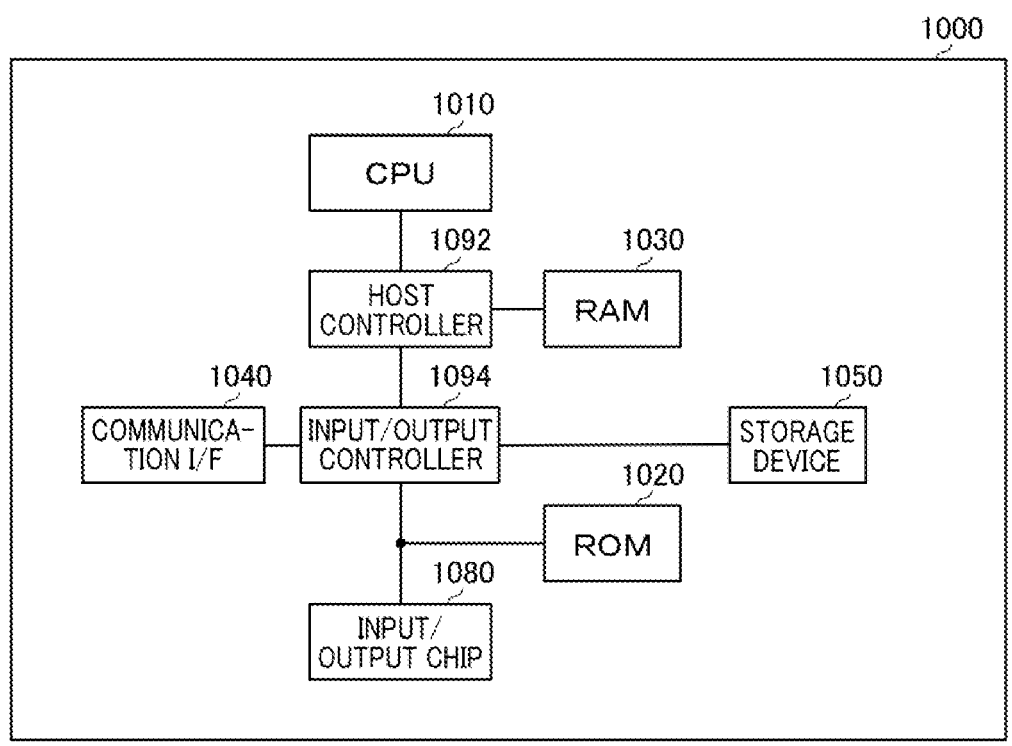
FIG. 9 shows schematically an example of a hardware configuration of a computer 1000 functioning as the control device 120 or the control device 200.

FIG. 9 shows schematically an example of a computer 1000 functioning as the control device 120 or the control device 200. The computer 1000 in accordance with the present embodiment includes a CPU peripheral unit including a CPU 1010 and a RAM 1030, which are mutually connected by a host controller 1092, and an input/output unit including a ROM 1020, a communication I/F 1040, a storage device 1050, and an input/output chip 1080, which are connected to the host controller 1092 by an input/output controller 1094.

The CPU 1010 operates based on programs stored in the ROM 1020 and the RAM 1030, thereby controlling each unit. The communication I/F 1040 communicates with other devices via the network. The communication I/F 1040 also functions as hardware for performing communication. The storage device 1050 may be a hard disk drive, a solid state disk, a solid state drive and the like, and stores programs and data that are used by the CPU 1010.

The ROM 1020 stores therein a boot program that is performed by the computer 1000 at the time of activation, and a program depending on the hardware of the computer 1000. The input/output chip 1080 connects various input/output units to the input/output controller 1094 via a USB port, a parallel port, a serial port, a keyboard port, a mouse port and the like, for example.

The program that is provided to the storage device 1050 via the RAM 1030 is provided with being stored in a recording medium such as an IC card by a user. The program is read from the recording medium, installed into the storage device 1050 via the RAM 1030, and performed by the CPU 1010.

The program installed in the computer 1000 to cause the computer 1000 to function as the control device 120 or the control device 200 may activate the CPU 1010 and the like to cause the computer 1000 to function as the respective units of the control device 120 or the control device 200. The information processing described in the programs functions as the instruction receiving unit 212, the instruction transmitting unit 214, the remaining battery level acquisition unit 222, the electric power generation amount acquisition unit 224, the light-receiving amount acquisition unit 226, the variation information acquisition unit 228, the traffic acquisition unit 230, the base station information acquisition unit 232, and the control unit 250, which are specific means in which software and various types of hardware resources described above cooperate with each other, as the programs are read into the computer 1000. The information processing described in the programs also functions as the instruction receiving unit 122, the control unit 130, the remaining battery level acquisition unit 132, the electric power generation amount acquisition unit 134, the light-receiving amount acquisition unit 136, the variation information acquisition unit 138, the traffic acquisition unit 140, and the base station information acquisition unit 142, which are specific means in which software and various types of hardware resources described above cooperate with each other, as the programs are read into the computer 1000. The specific means implements calculation or processing of information according to a use purpose of the computer 1000 of the present embodiment, so that the specific control device 120 or control device 200 is established according to the use purpose.

While the present invention has been described using the embodiments, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network, 22: gateway, 30: user terminal, 100: flight vehicle, 102: main body, 104: main wing, 106 propeller, 108: skid, 110: wheel, 112: solar cell panel, 120: control device, 122: instruction receiving unit, 130: control unit, 132: remaining battery level acquisition unit, 134: electric power generation amount acquisition unit, 136: light-receiving amount acquisition unit, 138: variation information acquisition unit, 140: traffic acquisition unit, 142: base station information acquisition unit, 150: communication area, 152: communication area, 160: cell, 161: cell A, 162: cell B, 163: cell C, 164: cell D, 165: cell E, 166: cell F, 167: cell 200: control device, 212: instruction receiving unit, 214: instruction transmitting unit, 222: remaining battery level acquisition unit, 224: electric power generation amount acquisition unit, 226: light-receiving amount acquisition unit, 228: variation information acquisition unit, 230: traffic acquisition unit, 232: base station information acquisition unit, 400: communication management apparatus, 1000: computer, 1010: CPU, 1020: ROM, 1030: RAM, 1040: communication I/F, 1050: storage device, 1080: input/output chip, 1092: host controller, 1094: input/output controller

What is claimed is:

1. A control device for controlling a flight vehicle including a battery; and an antenna for forming a communication area on a ground to provide wireless communication service for a user terminal in the communication area by using electric power of the battery, the control device comprising:
a remaining battery level acquisition unit for acquiring a remaining battery level of the battery; and a control unit for performing control so as to reduce a number of a plurality of cells included in the communication area when a predetermined condition is satisfied while the flight vehicle forms the communication area including the plurality of cells to provide wireless communication service for the user terminal, wherein the control unit performs the control so as to reduce the number of the plurality of cells included in the communication area when the predetermined condition is a remaining battery level being smaller than a predetermined threshold battery value.

2. The control device according to claim 1, wherein the flight vehicle includes an electric power generation unit, the battery stores electric power generated by the electric power generation unit, the control device comprises an electric power generation amount acquisition unit for acquiring an electric power generation amount generated by the electric power generation unit, and the control unit performs the control so as to reduce the number of the plurality of cells included in the communication area when the predetermined condition is an electric power generation amount generated by the electric power generation unit being smaller than a predetermined threshold power value.

3. The control device according to claim 1, comprising a variation information acquisition unit for acquiring variation information indicative of variation in communication traffic for each date and time in the wireless communication service that is provided for a plurality of user terminals by the flight vehicle, wherein the control unit specifies a time period during which the communication traffic is smaller than a predetermined threshold traffic value, based on the variation information, and performs control so as to reduce the number of the plurality of cells included in the communication area during the specified time period.

4. The control device according to claim 1, comprising a traffic acquisition unit for acquiring a communication traffic in the wireless communication service that is provided for a plurality of user terminals by the flight vehicle, wherein the control unit performs the control so as to reduce the number of the plurality of cells included in the communication area when the communication traffic acquired by the traffic acquisition unit satisfies the predetermined condition.

5. The control device according to claim 4, wherein the control unit performs the control so as to reduce the number of the plurality of cells included in the communication area when a duration time in a state where the communication traffic acquired by the traffic acquisition unit is smaller than a predetermined threshold traffic value is longer than a predetermined time.

6. The control device according to claim 1, comprising a base station information acquisition unit for acquiring base station information about a ground wireless base station equipped in a target area on the ground that is covered by the communication area formed by the flight vehicle, wherein the control unit performs the control so as to reduce the number of the plurality of cells included in the communication area when the base station information satisfies the predetermined condition.

7. The control device according to claim 1, wherein the control unit performs the control so as to reduce the number of the plurality of cells included in the communication area by determining a one of the plurality of cells to be continued and another of the plurality of cells to be stopped among the plurality of cells included in the communication area, and stopping formation of the another of the plurality of cells to be stopped.

8. The control device according to claim 7, wherein the control unit further performs the control so as to reduce the number of the plurality of cells included in the communication area by continuously increasing a size of the one of the plurality of cells to be continued, continuously decreasing a size of the another of the plurality of cells to be stopped, and then stopping formation of the another of the plurality of cells to be stopped.

9. The control device according to claim 7, wherein the control unit determines, based on a communication traffic of each of the plurality of cells included in the communication area, a one of the plurality of cells to be continued and another one of the plurality of cells to be stopped among the plurality of cells.

10. The control device according to claim 9, wherein the control unit further determines one of the plurality of cells having a higher communication traffic among the plurality of cells, as the one of the plurality of cells to be continued.

11. The control device according to claim 7, wherein the control unit determines, based on information about a target area on the ground that is covered by each of the plurality of cells included in the communication area, a one of the plurality of cells to be continued and another one of the plurality of cells to be stopped among the plurality of cells.

12. The control device according to claim 11, wherein the control unit further determines one of the plurality of cells in which a ratio of a city region of a covered target area is greatest, among the plurality of cells, as the one of the plurality of cells to be continued.

13. The control device according to claim 1, wherein the control device is equipped on the ground, and the control unit performs the control so as to reduce the number of the plurality of cells included in the communication area by transmitting a control signal for reducing the number of the plurality of cells formed by the antenna to the flight vehicle.

14. The control device according to claim 1, wherein the control device is mounted on the flight vehicle, and the control unit controls the antenna to reduce the number of the plurality of cells included in the communication area.

15. A control device for controlling a flight vehicle including a battery; an antenna for forming a communication area on a ground to provide wireless communication service for a user terminal in the communication area by using electric power of the battery; and an electric power generation unit, the control device comprising:

an electric power generation amount acquisition unit for acquiring an electric power generation amount generated by the electric power generation unit; and a control unit for performing control so as to reduce a number of a plurality of cells included in the communication area when a predetermined condition is satisfied while the flight vehicle forms the communication area including the plurality of cells to provide wireless communication service for the user terminal, wherein the battery stores electric power generated by the electric power generation unit, and the control unit performs control so as to reduce the number of the plurality of cells included in the communication area when the predetermined condition is an electric power generation amount generated by the electric power generation unit being smaller than a predetermined threshold power value.

16. The control device according to claim 15, wherein the electric power generation unit is a solar cell panel, the control device comprises a light-receiving amount acquisition unit for acquiring a light-receiving amount that is received by the solar cell panel, and the control unit performs the control so as to reduce the number of the plurality of cells included in the communication area when the light-receiving amount is smaller than a predetermined threshold light value.

17. A control device for controlling a flight vehicle including a battery; and an antenna for forming a communication area on a ground to provide wireless communication service for a user terminal in the communication area by using electric power of the battery, the control device comprising:
a base station information acquisition unit for acquiring base station information about a ground wireless base station equipped in a target area on the ground that is covered by the communication area formed by the flight vehicle; and
a control unit for performing control so as to reduce a number of a plurality of cells included in the communication area when a predetermined condition is satisfied while the flight vehicle forms the communication area including the plurality of cells to provide wireless communication service for the user terminal, wherein
the control unit performs the control so as to reduce the number of the plurality of cells included in the communication area to a number corresponding to a number of ground wireless base stations including the ground wireless base stations equipped in the target area when the base station information satisfies the predetermined condition.

18. A control device for controlling a flight vehicle including a battery; and an antenna for forming a communication area on a ground to provide wireless communication service for a user terminal in the communication area by using electric power of the battery, the control device comprising:
a control unit for performing control so as to reduce a number of the plurality of cells included in the communication area when a predetermined condition is satisfied while the flight vehicle forms the communication area including the plurality of cells to provide wireless communication service for the user terminal, wherein
the control unit performs the control so as to reduce the number of the plurality of cells included in the communication area by determining a one of the plurality of cells to be continued and another of the plurality of cells to be stopped among the plurality of cells included in the communication area, and stopping formation of the another of the plurality of cells to be stopped, and
the control unit determines the one of the plurality of cells to be continued from the plurality of cells, according to in descending order of communication traffic.

19. A program for causing a control device for controlling a flight vehicle, which includes a battery and an antenna for forming a communication area on a ground to provide wireless communication service for a user terminal in the communication area by using electric power of the battery, to function as:
a remaining battery level acquisition unit for acquiring a remaining battery level of the battery; and
a control unit for performing control so as to reduce a number of the plurality of cells included in the communication area when a predetermined condition is satisfied while the flight vehicle forms the communication area including the plurality of cells to provide wireless communication service for the user terminal, the control unit performing the control so as to reduce the number of the plurality of cells included in the communication area when the predetermined condition is a remaining battery level being smaller than a predetermined threshold battery value.

20. A control method for controlling a flight vehicle including a battery; and an antenna for forming a communication area on a ground to provide wireless communication service for a user terminal in the communication area by using electric power of the battery, the control method comprising:
acquiring a remaining battery level of the battery; and
performing control so as to reduce a number of a plurality of cells included in the communication area when a predetermined condition is satisfied while the flight vehicle forms the communication area including the plurality of cells to provide wireless communication service for the user terminal, wherein
the controlling step performs the control so as to reduce the number of the plurality of cells included in the communication area when the predetermined condition is a remaining battery level being smaller than a predetermined threshold battery value.

* * * * *